Aug. 11, 1936.  A. LYSHOLM ET AL  2,050,349
GAS TURBINE SYSTEM FOR AERIAL PROPULSION
Filed June 24, 1932  2 Sheets-Sheet 1
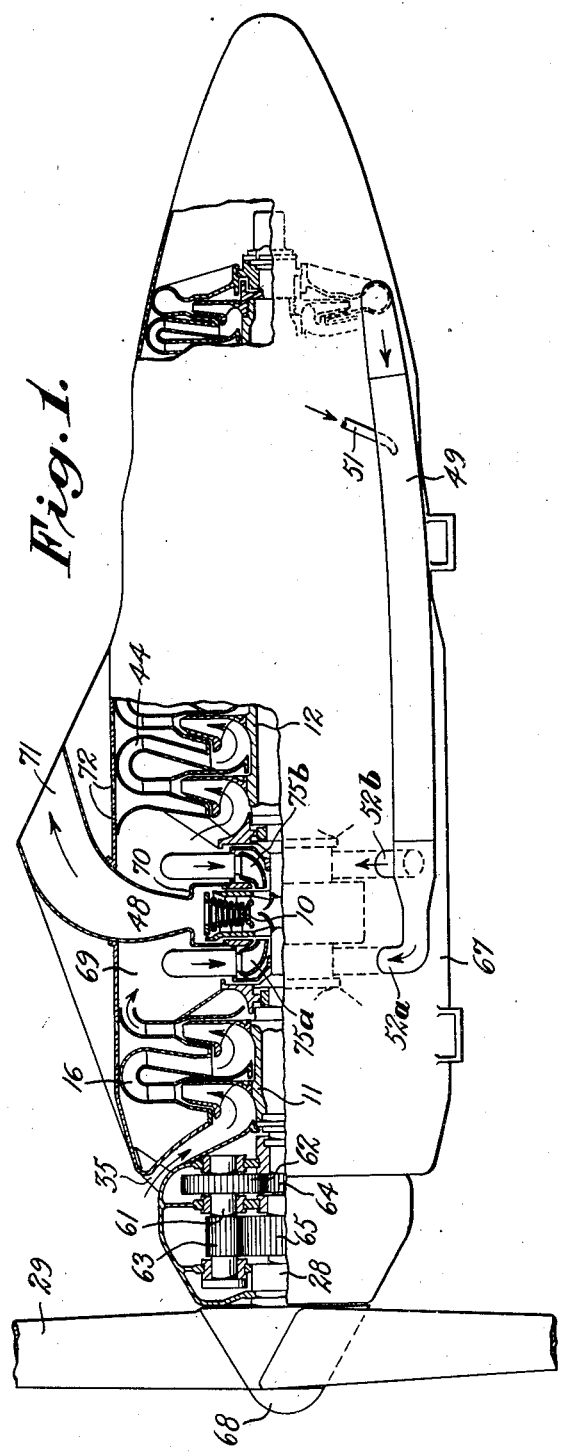

Patented Aug. 11, 1936

2,050,349

UNITED STATES PATENT OFFICE 2,050,349

GAS TURBINE SYSTEM FOR AERIAL PROPULSION

Alf Lysholm, Stockholm, and Gustav Karl William Boestad, Lidingo, Sweden, assignors to Aktiebolaget Milo, Stockholm, Sweden, a joint-stock company of Sweden Application June 24, 1932, Serial No. 619,094
In Germany November 23, 1931

23 Claims. (Cl. 244—25)

The present invention relates to gas turbine systems for driving propellers and has particular reference to systems for aerial propulsion.

In power plants for aerial propulsion, space and weight factors as well as efficiency and flexibility of operation are important factors to be considered and the factor of wind resistance is also highly important.

The general object of the present invention is to provide an improved type of gas turbine system for driving propellers which will provide efficient and flexible production of power and which will also have physical characteristics enabling the space, weight and other requirements of power plants for aerial propulsion to be fulfilled more satisfactorily than by the types of power plants heretofore employed.

In its broad aspects the invention may be embodied in apparatus of many different forms and for a better understanding of the nature of the invention and the more detailed objects thereof, together with the advantages to be derived from its use, reference may be had to the ensuing description of various embodiments of the invention illustrated in the accompanying drawings forming a part of this specification.

In the drawings:

Fig. 1 is a diagrammatic elevation, partly in section, of a gas turbine system in accordance with our invention, particularly adapted for aerial propulsion;

Figure 3:
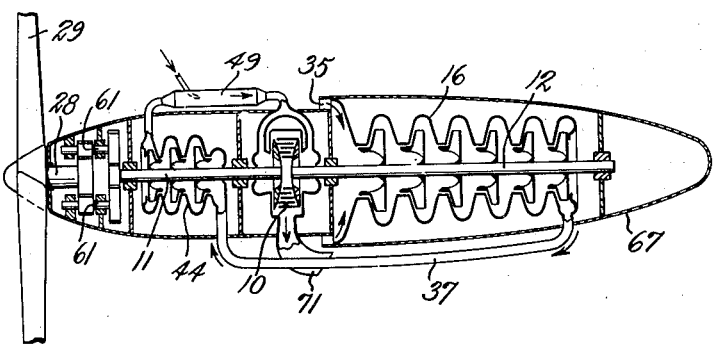
Figs. 2 to 5 are diagrammatic views similar to Fig. 1 and showing different variations of the type of gas turbine system illustrated in Fig. 1, and Figs. 6 and 7 are line diagrams illustrating different variations in the arrangement of parts in gas turbine systems embodying the invention.

Turning now to Fig. 1, there is illustrated an embodiment of the invention providing a gas turbine system particularly adapted for aerial propulsion. In this embodiment the turbine part of the system comprises a radial flow double rotation gas turbine 10 having hollow shafts 11 and 12 upon which are mounted the rotor elements of a low pressure compressor 16 and a high pressure compressor 44. These compressors, are preferably of the multi-stage rotary type and when mounted in the manner indicated in the figure, it will be evident that the turbine and compressors may advantageously be housed in a common elongated casing or shell 67 of stream lined form, which offers the minimum air resistance. The forward end of the shell 67 is tapered to meet the hub 68 of propeller 29. Propeller shaft 28 is mounted coaxially with shafts 11 and 12 and is driven from shaft 11 at reduced speed through the gearing comprising countershaft 61 and its gears 62 and 63 meshing respectively with pinion 64 on shaft 11 and gear 65 on shaft 28.

The inlet 35 of the low pressure compressor 16 is located in the zone of the slip stream from the propeller and opens toward the propeller. Air which is initially compressed in compressor 16 is discharged through the annular passage 69 within the shell 67 and outside of the turbine casing 70 to the inlet of compressor 44. From the outlet of compressor 44 the compressed air is delivered to combustion chamber 49, supplied with fuel through pipe 51. From combustion chamber 49 the heated motive fluid is admitted to the turbine through the branch conduits 52a and 52b.

Only one combustion chamber is indicated in the drawings. Preferably, motive fluid is supplied to the turbine from a plurality of combustion chambers arranged in parallel with respect to flow of fluid from the discharge end of the high pressure compressor to the turbine, and circumferentially spaced around the shell 67.

The discharge conduit 48 from turbine 10 extends through the shell 67 and terminates in an outlet opening 71 located in the zone of the slip stream from the propeller and directed away from the propeller. Shell 67 is advantageously provided with a number of openings 72 some of which are directed away from the propeller.

The operation of the above described system is as follows, assuming the motive fluid to be air in which fuel such as oil is burned. Atmospheric air is admitted to the inlet 35 of the compressor 16 and is progressively compressed in the serially connected compressors 16 and 44, and delivered to the combustion chamber 49. From the combustion chamber 49 the heated motive fluid is expanded in turbine 10 and in passing through this turbine provides the power for driving propeller 29 through the reduction gearing and for directly driving the compressors 16 and 44.

It will be apparent that the arrangement according to this embodiment provides a power plant of extreme compactness, which is particularly adapted for purposes of aerial propulsion requiring the power plant to be exposed to the rush of air past the apparatus. The entire apparatus, as will be observed, may be enclosed in a single stream lined shell offering the minimum amount of wind resistance and the arrangement also provides for utilization of the air leaving the propeller to increase the efficiency of the plant. It will be evident that the location of the inlet 35 to the low pressure compressor in the zone of the slip stream will aid in forcing air into the low pressure compressor, thus increasing its efficiency. By locating the exhaust outlet 71 from the turbine in the manner shown, the slip stream from the propeller will tend to create a partial vacuum at the outlet, thus reducing the effective back pressure against which the turbine must exhaust and consequently tending to increase the efficiency of the turbine. Also the arrangement of the openings 72 in the shell makes it possible to effect a circulation of air for cooling purposes around the compressor parts.

The apparatus shown in Fig. 1 may be started in any of the well-known manners for starting gas turbines. However, inasmuch as this forms no part of the present invention, it has not been illustrated.

Figure 2:
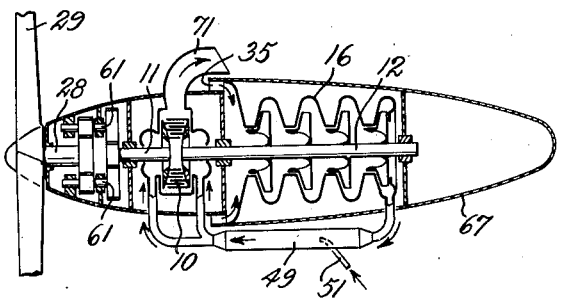

Figs. 2 to 5 illustrate different embodiments of the same general type of arrangement shown in Fig. 1. In Fig. 2 a single compressor 16 is employed. This compressor is mounted on shaft 12 behind turbine 10 and has an inlet 35 in the slip stream zone which opens toward propeller 29. Propeller shaft 28 is mounted coaxially with respect to turbine shafts 11 and 12 and is connected to shaft 11 by means of speed reducing countershafts 61 and gearing similar to that illustrated in Fig. 1. Compressed air discharged from compressor 16 is heated to provide a suitable heated motive fluid by combustion in combustion chamber 49 to which fuel is supplied through pipe 51. From combustion chamber 49 the motive fluid is supplied to turbine 10 and is exhausted therefrom through the outlet 71 located in the slip stream zone and directed away from the propeller. In this embodiment one of the turbine shafts drives only a compressor element while all of the power developed by the other turbine shaft is transmitted to the propeller shaft.

The arrangement shown in Fig. 3 is similar to the arrangement of Fig. 1 in that the system comprises one turbine driving two compressors and the propeller. In the present arrangement, the low pressure compressor 16 is driven by the shaft 12 and the high pressure compressor 44 is driven by the turbine shaft 11 which shaft is connected through countershafts 61 and associated gears to the propeller shaft 28. As in the previously described embodiments, the inlet 35 of compressor 16 is located in the slip stream zone and opens toward the propeller. The air compressed in compressor 16 is delivered through one or more conduits 37 to the inlet of the high pressure compressor 44 from which the highly compressed air is delivered to combustion chamber 49 and from the latter to the inlet of the turbine 10. The outlet 71 of turbine 10 is again located in the slip stream zone and directed away from the propeller.

Figure 4:
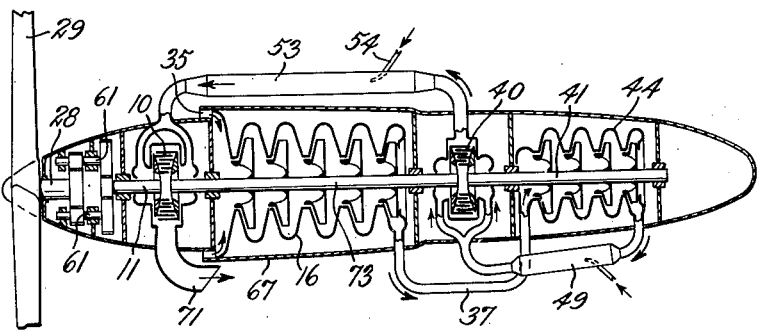

Fig. 4 illustrates a system for aerial propulsion comprising two turbines. The low pressure turbine 10 is located adjacent the forward end of shell 67 and shaft 11 of this turbine is connected to the propeller shaft 28 through the medium of countershafts 61 and associated gearing. The high pressure turbine 40 is located rearwardly of turbine 10 and spaced therefrom and between the two turbines is located the low pressure compressor 16. In this embodiment the adjacent rotors of the turbines 10 and 40 are connected by a common shaft 73 upon which the rotor elements compressor 16 are mounted. Shaft 41 of turbine 40 carries the rotor elements of the high pressure compressor 44 situated behind turbine 40 in the shell 67. Inlet 35 of compressor 16 opens forwardly in the slip stream zone and air compressed in the low pressure compressor is conducted through the conduit 37 to the inlet of compressor 44 from which it is delivered to combustion chamber 49 and to the inlet of the high pressure turbine 40. The motive fluid exhausted from turbine 40 is delivered to a second combustion chamber 53 for reheating and then flows to the low pressure turbine 10 from which it is exhausted through the rearwardly directed outlet 71 located in the slip stream zone.

Figure 5:
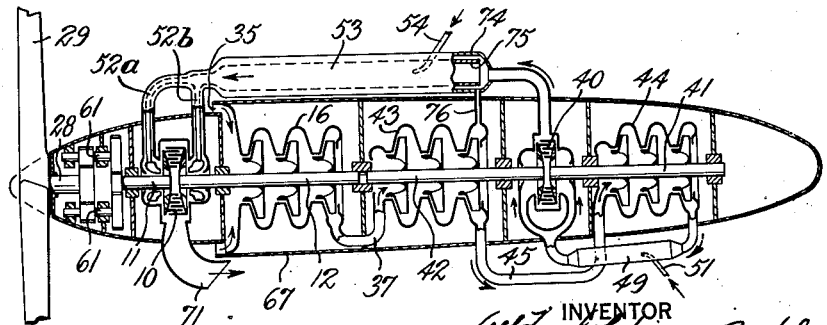

In the embodiment illustrated in Fig. 5 the system comprises two turbines and three compressors. In this embodiment the low pressure turbine 10 is again located in the forward part of the shell 67 and the shaft 11 drives the propeller shaft 28 in the manner already described in connection with previous embodiments. The high pressure turbine 40 is situated in the casing rearwardly of the low pressure turbine 10 and between the two turbines are situated two compressors arranged on independent shafts. The low pressure compressor 16 is driven by shaft 12 of the low pressure turbine and the intermediate pressure compressor 43 is driven by shaft 42 of turbine 40. The high pressure compressor 44 is located behind turbine 40 and is driven by shaft 41 thereof. The path of flow of air and motive fluid through the system is similar to that previously described. The inlet 35 of the low pressure compressor opens forwardly in the slip stream of the propeller and the outlet of the low pressure compressor is connected to the inlet of the intermediate pressure compressor by pipe 37. The outlet of the intermediate pressure compressor is connected to the inlet of the high pressure compressor by means of pipe 45 and the high pressure compressor delivers to the combustion chamber 49. Motive fluid discharged from combustion chamber 49 is expanded in turbine 40 and is delivered to the reheating combustion chamber 53 to which fuel is supplied through pipe 54.

In this embodiment we have indicated a combustion chamber construction embodying the principles of the invention claimed in United States application, Serial No. 619,093, filed June 24, 1932, and which may advantageously be employed in systems of the type contemplated by the present invention. In this arrangement the combustion chamber comprises an outer wall 74 and an inner wall 75 spaced from the wall 74 to provide an annular space between the two walls. The fuel supplied through pipe 54 is admitted to the space within the wall 75 and cooler air or gas is admitted to the space between walls 74 and 75. The motive fluid in the inner part of the combustion chamber, in the presence of which fuel is burned, is heated to high temperature and the cooler fluid admitted to the space between the walls of the combustion chamber provides a jacket surrounding the high temperature motive fluid and serving to protect the more sensitive parts of the apparatus. As indicated on the drawing, the spaced walls 74 and 75 are continued through the admission pipes indicated generally at 52a and 52b and the high temperature motive fluid and the motive fluid of lower temperature are mixed for the first time at the inlet of the blade system of the turbine. It will be apparent that the two streams of motive fluid should be at substantially the same pressure and in the present embodiment the motive fluid of lower temperature is supplied to the space between walls 74 and 75 of the combustion chamber through a supply conduit 76 leading from the intermediate pressure compressor 43.

It will be apparent that combustion chamber arrangements such as that just described may be employed in conjunction with any of the combustion chambers shown in the several embodiments of the invention which have previously been described. The turbine shown in Fig. 1 is, for example, adapted to be supplied with motive fluid from a combustion chamber and supply conduits around which the stream of relatively cool motive fluid flows. In this figure, the high temperature motive fluid is delivered through the inner conduits formed by walls 75a and 75b.

All of the arrangements shown in Figs. 1 to 5 afford the flexibility of operation incident to the mounting of the compressors on shafts independent of the propeller shaft so that the speeds of the compressor shafts may be varied to compensate for variations in load on the propeller shaft. In the case of turbine systems wherein double rotation turbines are employed, there is a certain automatic tendency of the turbines to vary the shaft speeds in a manner compensating for variations in load. Thus, if the load increases and the shaft of the turbine driving the propeller shaft slows down, the immediate tendency is for the speed of the other shaft of the turbine to increase. When, as in accordance with the present invention, this latter shaft is employed to drive a compressor supplying motive fluid for the turbine or a constituent thereof, the increased quantity of compressed gaseous medium due to the increase in speed of the compressor tends to compensate for the increase in load.

The use of double rotation turbines has numerous advantages in the field of aerial propulsion. As previously pointed out, the nature of the apparatus makes it possible to provide a compact power plant which may be housed in a shell or casing offering the minimum wind resistance. Moreover, the arrangement of all of the turbine parts about a given axis of rotation results in a neutralization of forces due to the rotating masses which is of particular advantage when the power plant is used for the propulsion of air craft in which stability is a factor. The oppositely rotating masses tend to minimize precession due to gyroscopic effect. As a further advantage it is to be noted that the radial flow turbine of the double rotation type may be designed so that the two shafts thereof normally operate at different speeds. Because of this property of this type of turbine, it is possible to design the compressors for speeds of operation permitting them to have the smallest possible external diameter. Furthermore, a double rotation radial flow turbine of small size is capable of delivering a relatively large amount of power as compared with other forms of prime movers. For example, a gas turbine system designed to deliver 2000 H. P. can be built with a maximum diameter of about 47 inches. This can be accomplished because of the fact that the turbine itself may have a diameter of about 25 inches and the diameters of the compressors necessary to supply the motive fluid for the turbine may be made relatively small because of the special adaptability of the double rotation type of turbine as a means for driving the compressors at the most efficient speeds.

It will be appreciated that the double rotation type of turbine also provides numerous other advantages for purposes of aerial propulsion. The turbines are compact axially as well as radially and are particularly adapted to arrangements in which two or even more turbines are arranged on the same axis of rotation.

In addition to the compressors driven by the turbines it will be evident that further auxiliary apparatus may be mounted on the turbine shafts. For example, one or more electric generators may be mounted on an extension of one of the turbine shafts for producing current adapted to drive a motor driven propeller or a plurality thereof.

From the foregoing description it will be evident that various modifications in the arrangement of parts illustrated may be made without departing from the present invention. Some variations of the arrangement are shown in Figs. 6 and 7.

In Fig. 6 the turbine 10 comprises a shaft 11 adapted to rotate in one direction and driving the propeller 29 through countershafts 61, and a hollow shaft 12a extending around shaft 11, the two shafts being on the same side of the turbine and shaft 12a driving a compressor indicated at 16. In Fig. 7 each of shafts 11 and 12 drive both a compressor and a propeller, shaft 11 driving the compressor indicated at 16 and also driving the propeller 29 through counter shafts 61, and shaft 12 driving a compressor 44 and also a propeller 29a through counter shafts 61a.

For aerial propulsion the maximum desirable speed of rotation of the propeller or propellers is usually less than the minimum desirable speed for the turbine and compressor parts of the system and speed reducing mechanism is accordingly ordinarily employed. It will be evident, however, that in case propeller operation is desired at speeds commensurate with suitable turbine speeds, the speed reducing mechanism may be omitted and the propeller driven directly from one of the turbine shafts. Where the speed reducing mechanism is employed it may consist of types of apparatus other than the mechanical gearing shown herein by way of illustration.

In the embodiments of the invention herein disclosed, the apparatus has been shown as driving propellers of the tractor type, with the exception of Fig. 7, where propeller 29a is of the pusher type. It will be evident that any of the arrangements shown may also be employed to drive propellers of the pusher type. In connection with the use of the apparatus with pusher types of propellers, it is to be understood that the term "slip stream zone of the propeller" as hereinbefore employed is to be considered as including a zone in front of the propeller as well as behind the propeller in the direction of air flow. It will be apparent that for purposes of accelerating air flow into the inlet of the low pressure compressor and also for reducing the back pressure of the turbine exhausting to atmosphere, the flow of air toward the propeller will be effective in the same manner as the flow of air leaving the propeller.

While in accordance with the patent statutes preferred embodiments of the invention have been illustrated by way of example, it is to be understood that the invention is not limited in its scope to the embodiments shown but may be embodied in other forms of apparatus which may or may not employ certain characteristic features of the invention to the exclusion of others.

What is claimed is:

1. A gas turbine power plant for aerial propulsion comprising an elongated outer casing, a radial flow turbine of the double rotation type having coaxial shafts mounted centrally and longitudinally of said casing, a propeller mounted at one end of the casing and coaxial with said shafts, said propeller being driven from one of said shafts and a plurality of compressors mounted on said shafts for compressing a gaseous medium to be utilized in said turbine.

2. A gas turbine power plant for aerial propulsion comprising an elongated outer casing, a radial flow turbine of the double rotation type having coaxial shafts mounted centrally and longitudinally of said casing, a propeller mounted at one end of the casing and coaxial with said shafts, speed reducing mechanism within the casing for driving said propeller from one of said shafts and a plurality of compressors mounted on said shafts for compressing a gaseous medium to be utilized in said turbine.

3. A gas turbine power plant for aerial propulsion comprising an elongated outer casing, a plurality of radial flow double rotation turbines each comprising coaxial shafts adapted to rotate in opposite directions, said shafts being coaxially mounted centrally and longitudinally of said casing and said turbines being longitudinally spaced, a propeller mounted at one end of the casing and coaxial with said shafts, said propeller being driven from one of said shafts and a plurality of compressors mounted on said shafts for compressing a gaseous medium to be utilized in said turbines, said compressors being serially connected with respect to flow of the medium to be compressed and said turbines being serially connected with respect to flow of motive fluid therethrough.

4. A gas turbine power plant for aerial propulsion comprising a turbine of the double rotation type having two shafts adapted to rotate in opposite directions, a compressor mounted on one of said shafts, a propeller driven by the other of said shafts, a second turbine, of the double rotation type having two shafts adapted to rotate in opposite directions, a compressor mounted on each of the shafts of said second turbine, said compressors being serially connected with respect to the medium to be compressed and the compressor driven by the first mentioned turbine being the low pressure compressor, means for delivering compressed motive fluid from the compressor of highest pressure to said second turbine, means for conducting motive fluid exhausted from said second turbine to the first mentioned turbine, all of said shafts and said propeller being coaxially mounted and an elongated casing enclosing the turbines and compressors.

5. A gas turbine power plant for aerial propulsion comprising a double rotation turbine having coaxially mounted shafts adapted to rotate in opposite directions, a plurality of compressors each having a rotor mounted on a different one of said shafts and a propeller mounted in axial alignment with and driven by one of said shafts.

6. A gas turbine power plant for aerial propulsion comprising a double rotation turbine having coaxially mounted shafts adapted to rotate in opposite directions, a compressor having a rotor mounted on one of said shafts for compressing a gaseous medium to be utilized in the turbine, a propeller mounted in axial alignment with and driven by the other of said shafts, a second gas turbine of the double rotation type having two shafts adapted to rotate in opposite directions, a plurality of compressors each having a rotor mounted on a different one of the shafts of said second turbine, means for connecting said compressors to provide series flow of the medium to be compressed through at least two of the compressors and means for conducting motive fluid to said turbines.

7. A gas turbine power plant for aerial propulsion comprising a double rotation turbine having coaxially mounted shafts adapted to rotate in opposite directions, a compressor having a rotor mounted on one of said shafts for compressing a gaseous medium to be utilized in the turbine, a propeller mounted in axial alignment with and driven by the other of said shafts, a second gas turbine of the double rotation type having two shafts adapted to rotate in opposite directions, a plurality of compressors each having a rotor mounted on a different one of the shafts of said second turbine, means for connecting said compressors serially with respect to flow therethrough of the medium to be compressed and means for conducting motive fluid serially through said turbines.

8. A gas turbine power plant for aerial propulsion comprising a double rotation turbine having coaxially mounted shafts adapted to rotate in opposite directions, a compressor having a rotor mounted on one of said shafts for compressing a gaseous medium to be utilized in the turbine, a propeller mounted in axial alignment with and driven by the other of said shafts, a second gas turbine of the double rotation type having two shafts adapted to rotate in opposite directions, a plurality of compressors each having a rotor mounted on a different one of the shafts of said second turbine, means for connecting said compressors serially with respect to flow therethrough of the medium to be compressed and means for conducting motive fluid serially first through said second turbine and then through the first mentioned turbine.

9. A gas turbine power plant for aerial propulsion comprising a double rotation turbine having coaxially mounted shafts adapted to rotate in opposite directions, a compressor having a rotor on one of said shafts, a propeller mounted in axial alignment with and driven by the other of said shafts, a second gas turbine of the double rotation type having two coaxial shafts adapted to rotate in opposite directions, said turbines being coaxial, a compressor driven by each of the shafts of said second turbine, means for connecting at least two of said turbines serially with respect to flow therethrough of the medium to be compressed and means for conducting motive fluid to said turbines.

10. A power plant for aerial propulsion comprising a plurality of rotary compressors having rotors mounted in axial alignment, a plurality of gas turbines of the radial flow double rotation type each having two coaxial shafts adapted to rotate in opposite directions, each of said rotors being mounted on a different one of said shafts and a propeller mounted in alignment with the axis of rotation of said rotors and driven by one of said shafts.

11. In a gas turbine power plant for aerial propulsion, a casing, a gas turbine of the double rotation type mounted in said casing, said turbine having two shafts adapted to rotate in opposite directions and mounted coaxially and centrally of the casing, a compressor having a rotor mounted on one of said shafts for compressing a gaseous medium to be utilized in the turbine and a propeller driven by the other of said shafts and mounted at one end of said casing in alignment with said shafts, said casing having an annular opening providing an inlet for air to the compressor, said opening being located in the slip stream zone of the propeller.

12. In a gas turbine power plant for aerial propulsion, a casing, a gas turbine of the double rotation type having two coaxial shafts adapted to rotate in opposite directions, and mounted axially and centrally of the casing, means for compressing a gaseous medium to be utilized in the turbine comprising a first compressor having a rotor mounted on one of said shafts and a second compressor having a rotor mounted on the other of said shafts, a propeller mounted at one end of the casing, said propeller being driven by one of said shafts and in alignment with said shafts, and an annular opening in said casing in the slip stream zone of the propeller providing an inlet for supplying air to one of said rotors.

13. In a gas turbine power plant for aerial propulsion, a casing, a gas turbine of the double rotation type having two coaxial shafts adapted to rotate in opposite directions, said shafts being mounted axially and centrally of the casing, a propeller driven by one of said shafts and mounted at one end of the casing in alignment with the shafts and a plurality of compressors each having a rotor mounted on a different one of said shafts, said compressors being adapted to compress a gaseous medium to be utilized in the turbine and the compressor driven by the shaft which drives the propeller being a low pressure compressor.

14. In a gas turbine power plant for aerial propulsion, a gas turbine of the double rotation type having two coaxial shafts adapted to rotate in opposite directions, a propeller and a compressor driven by one of said shafts, and a second compressor driven by the other of said shafts, said compressors being adapted to compress a gaseous medium to be utilized in the turbine.

15. A gas turbine power plant for aerial propulsion comprising an elongated casing, a double rotation turbine having two shafts adapted to rotate in opposite directions and coaxially mounted centrally of the casing, a propeller mounted at one end of the casing, means for driving said propeller from one of said shafts, a compressor having a rotor mounted on the other of said shafts, said compressor being adapted to compress a gaseous medium to be utilized in the turbine, means providing a combustion chamber extending axially of said casing, means for connecting the outlet of the compressor with one end of said combustion chamber and means for connecting the other end of said combustion chamber with said turbine.

16. In a gas turbine power plant for aerial propulsion, an elongated casing, a gas turbine of the double rotation type having two coaxial shafts mounted centrally of the casing, a propeller at one end of the casing, means for driving said propeller from one of said shafts, a compressor having a rotor mounted on the other of said shafts and having an outlet remote from the turbine, means providing an elongated combustion chamber disposed longitudinally of the casing between the outlet end of the compressor and the outlet of the turbine, means for connecting the outlet of the compressor with one end of said combustion chamber and means for connecting the other end of said combustion chamber with said turbine.

17. In a gas turbine power plant for aerial propulsion comprising an elongated casing, a plurality of gas turbines of the double rotation type each having two coaxial shafts adapted to rotate in opposite directions, said turbines being spaced longitudinally of the casing and mounted with said shafts at the central longitudinal axis of the casing, a plurality of compressors having rotors mounted on said shafts, a propeller mounted at one end of said casing and driven by one of said shafts, said compressors being adapted to compress a gaseous medium to be utilized in said turbines, means providing a first elongated combustion chamber disposed longitudinally of said casing, means providing a second elongated combustion chamber disposed longitudinally of said casing, means for conducting the compressed gaseous medium to the first combustion chamber, means for delivering motive fluid to one of said turbines from said first combustion chamber, means for exhausting motive fluid from said one of said turbines to said second combustion chamber and means for delivering motive fluid from said second combustion chamber to the other of said turbines.

18. In a gas turbine power plant for aerial propulsion comprising an elongated casing, a gas turbine of the double rotation type having two coaxial shafts mounted centrally of the casing, a propeller at one end of the casing driven by one of said shafts, a compressor having a rotor mounted on the other of said shafts, the outlet of said compressor being at the end thereof remote from the turbine and means providing a plurality of peripherally spaced combustion chambers disposed longitudinally of the casing between the outlet of the compressor and the turbine, means for delivering compressed gaseous medium from the outlet of said compressor to the end of each of said combustion chambers remote from the turbine and means for delivering motive fluid from the other end of each of said combustion chambers to the turbine.

19. A gas turbine power plant for aerial propulsion comprising an elongated casing, a plurality of longitudinally spaced bearings supported by said casing, said bearings being arranged in axial alignment centrally of the casing, there being two bearings adjacent to the ends of the casing and at least two intermediate bearings, separate shafts mounted in said bearings comprising two shafts having overhung ends between two adjacent intermediate bearings, blade carrying discs mounted on said overhung shaft ends and providing a radial flow double rotation turbine blade system, a centrifugal air compressor having a rotor mounted on one of said shafts on the side of one of said adjacent intermediate bearings opposite to the disc carried by the shaft, a propeller mounted coaxially with said shafts at one end of the casing and driven by the other of the disc-carrying shafts and conduit means including a combustion chamber for conducting to said blade system a motive fluid comprising air compressed in said compressor.

20. A gas turbine power plant for aerial propulsion comprising an elongated casing, a plurality of bearings longitudinally spaced from each other and supported by said casing centrally thereof in axial alignment, there being two bearings adjacent to the ends of the casing and a plurality of sets of intermediate bearings, a plurality of shafts mounted in said bearings comprising shafts providing two overhung shaft ends between each of a plurality of sets of intermediate bearings, blade-carrying discs mounted on said overhung shaft ends providing two radial flow double rotation turbine blade systems longitudinally spaced within the casing, a plurality of compressors having rotors mounted on said shafts and including a rotor mounted between said blade systems, a propeller mounted at one end of the casing coaxially with said shafts and driven by one of the disc-carrying shafts and conduit means including a plurality of combustion chambers arranged to cause air to be compressed to flow serially through said compressors and to cause motive fluid to flow serially through said turbines, there being a combustion chamber arranged in the path of flow between the compressor of highest pressure and one of said blade systems and a second combustion chamber in the path of flow between the two blade systems.

21. A gas turbine power plant comprising an elongated casing, a plurality of longitudinally spaced bearings supported by said casing, said bearings being arranged in axial alignment within the casing centrally thereof, there being two bearings adjacent to the ends of the casing and a plurality of intermediate bearings, separate shafts mounted in said bearings comprising a propeller shaft and two shafts having overhung ends between two adjacent intermediate bearings, blade-carrying discs mounted on said overhung shaft ends and providing a radial flow double rotation turbine blade system, a centrifugal air compressor having a rotor mounted on one of said shafts on the side of one of said adjacent intermediate bearings opposite to the discs carried by the shaft, said propeller shaft being mounted in one of said bearings adjacent to one end of the casing, a propeller mounted on said propeller shaft, a plurality of additional bearings carried by said casing, means for transmitting power from one of the disc-carrying shafts to the propeller shaft at reduced speed comprising gearing including a countershaft mounted in said additional bearings, and conduit means including a combustion chamber for delivering to said turbine blade system motive fluid comprising air compressed in said compressor.

22. A gas turbine power plant for aerial propulsion comprising an elongated casing, a plurality of longitudinally spaced bearings supported by said casing, said bearings being arranged in axial alignment centrally of the casing, there being two bearings adjacent to the ends of the casing and a plurality of intermediate bearings, separate shafts mounted in said bearings comprising a propeller shaft mounted in one of the bearings adjacent to one end of the casing and two separate turbine shafts having overhung ends between two adjacent intermediate bearings, blade-carrying discs mounted on said overhung shaft ends and providing a radial flow double rotation turbine blade system, centrifugal air compressors each having a rotor mounted on a different one of said turbine shafts on the side of an intermediate bearing opposite to the disc carried by the shaft, a propeller mounted on said propeller shaft, additional bearings carried by said casing, means for transmitting power from one of said turbine shafts to said propeller shaft at reduced speed comprising reduction gearing including a countershaft mounted in said additional bearings and conduit means including a combustion chamber for causing air to be compressed to flow serially through said compressors and for delivering to said turbine blade system motive fluid comprising air compressed in said compressors.

23. An aircraft power plant of the continuous combustion gas turbine type comprising an elongated casing structure having a longitudinal axis and adapted to be mounted with its longitudinal axis in the line of flight of the aircraft, a double rotation gas turbine having shafts mounted coaxially of said casing and adapted to rotate in opposite directions and blading providing a path of multiple stage expansion of motive fluid in a direction having a substantial component of flow in radially outward direction, air compressing means including a first compressor having a rotor mounted on one of said shafts and a second compressor having a rotor mounted on the second of said shafts, an air-screw propeller mounted at the forward end of said casing structure and driven at reduced speed from one of said shafts, a combustion chamber, means for continuously supplying fuel to said chamber, and open conduits for continuously conducting air from said compressors to said combustion chamber and for conducting motive fluid from the combustion chamber to the turbine.

ALF LYSHOLM.
GUSTAV KARL WILLIAM BOESTAD.